United States Patent
Hsu et al.

(10) Patent No.: US 11,969,844 B2
(45) Date of Patent: Apr. 30, 2024

(54) ELECTRONIC DEVICE AND METHOD FOR DETECTING AND COMPENSATING CNC TOOLS

(71) Applicant: Fulian Yuzhan Precision Technology Co.,Ltd, Shenzhen (CN)

(72) Inventors: Hsing-Chih Hsu, New Taipei (TW); Zhao-Yao Yi, Shenzhen (CN); Lei Zhu, Shenzhen (CN); Chang-Li Zhang, Shenzhen (CN); Er-Yang Ma, Shenzhen (CN); Chih-Sheng Lin, New Taipei (TW); Feng Xie, Shenzhen (CN); Ming-Tao Luo, Shenzhen (CN)

(73) Assignee: Fulian Yuzhan Precision Technology Co., Ltd, Shenzhen (CN)

(*) Notice: Subject to any disclaimer, the term of this patent is extended or adjusted under 35 U.S.C. 154(b) by 526 days.

(21) Appl. No.: 17/227,768

(22) Filed: Apr. 12, 2021

(65) Prior Publication Data
US 2021/0316413 A1    Oct. 14, 2021

(30) Foreign Application Priority Data
Apr. 14, 2020   (CN) .......................... 202010292268.2

(51) Int. Cl.
  *B23Q 17/09*   (2006.01)
  *G05B 19/404*  (2006.01)

(52) U.S. Cl.
  CPC ..... *B23Q 17/0995* (2013.01); *B23Q 17/0909* (2013.01); *B23Q 17/0914* (2013.01); *G05B 19/404* (2013.01)

(58) Field of Classification Search
  None
  See application file for complete search history.

(56) References Cited

U.S. PATENT DOCUMENTS 4,620,281 A * 10/1986 Thompson ......... G05B 19/4065
                                                    73/104

FOREIGN PATENT DOCUMENTS

| CN | 101780649 A | 7/2010 |
| CN | 104708322 A | 6/2015 |
| CN | 105479269 A | 4/2016 |

* cited by examiner

Primary Examiner — Ryan A Jarrett
(74) Attorney, Agent, or Firm — ScienBiziP, P.C.

(57) ABSTRACT

A method for detecting and compensating CNC tools being implemented in an electronic device, receives from a detector first parameters and second parameters in respect of a first tool. Such first parameters include at least one of service life, blade break information, and blade chipping information of the first tool, and such second parameters include at least one of length extension information, length wear information, radial wear information, and blade thickness wear information of the first tool. Based on the first parameters, instructions to process the workpiece are transmitted or not. Upon receiving the second parameters, instructions to adjust operation of the first tool are transmitted, to compensate for deterioration in normal use.

16 Claims, 4 Drawing Sheets

ELECTRONIC DEVICE AND METHOD FOR DETECTING AND COMPENSATING CNC TOOLS

CROSS-REFERENCE TO RELATED APPLICATIONS

This application claims priority to Chinese Patent Application No. 202010292268.2 filed on Apr. 14, 2020, the contents of which are incorporated by reference herein.

FIELD

The subject matter herein generally relates to computer numerical control technology, and particularly to an electronic device and a method for detecting and compensating CNC tools.

BACKGROUND

Computerized Numerical Control (CNC) equipment is widely used in industrial production. CNC equipment includes tools for processing workpieces, materials, and other component, and the physical quality of tools is important. Wear and permissible length of service life of the tools can be assessed and decided manually. However, human errors and misjudgements can be easily made.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
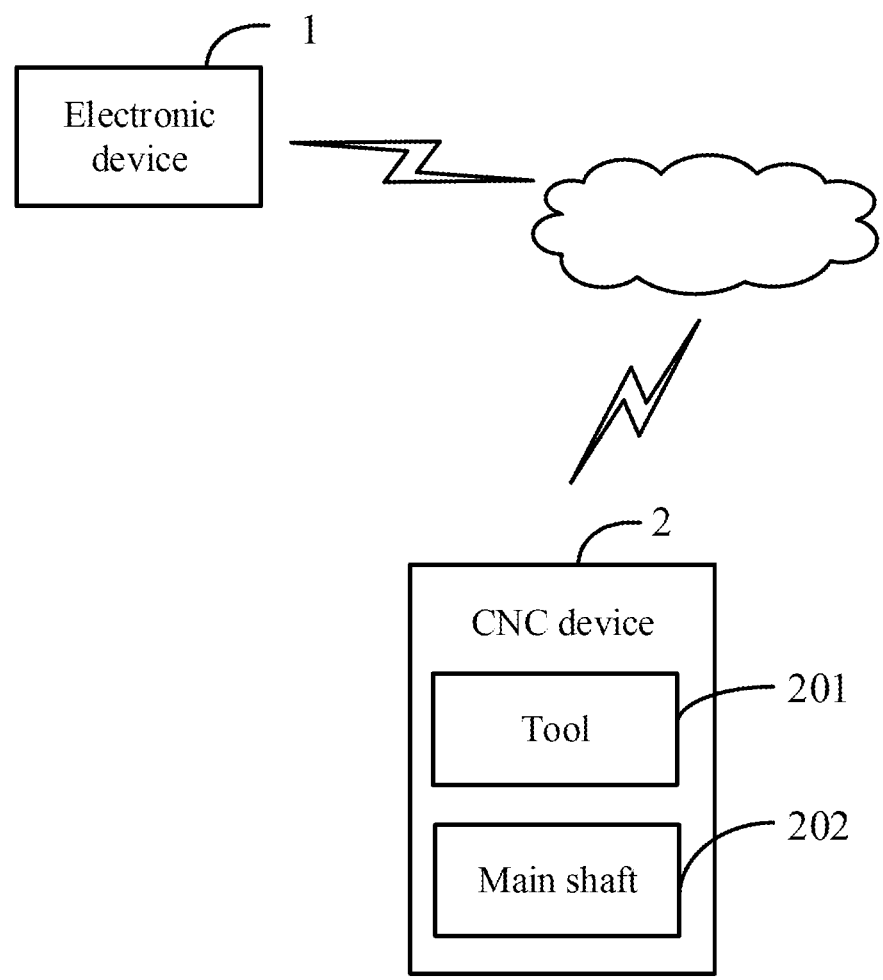
FIG. 1 is a schematic view of an embodiment of an application environment of an electronic device a method for detecting and compensating CNC tools.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Referring to FIG. 1, an electronic device 1 which couples with a CNC device 2 is illustrated. The electronic device 1 can communicate with the CNC device 2 through wired network and wireless network. In one embodiment, the wireless network can be internet, WI-FI, or cellular network. The cellular network can be 4G network or 5G network.

In one embodiment, the electronic device 1 can be a personal computer or a server. The CNC device 2 includes, but is not limited to, at least one tool 201 and a main shaft 202. The tool 201 is arranged on the main shaft 202. The CNC device 2 can use the tool 201 to process workpieces.

Figure 2:
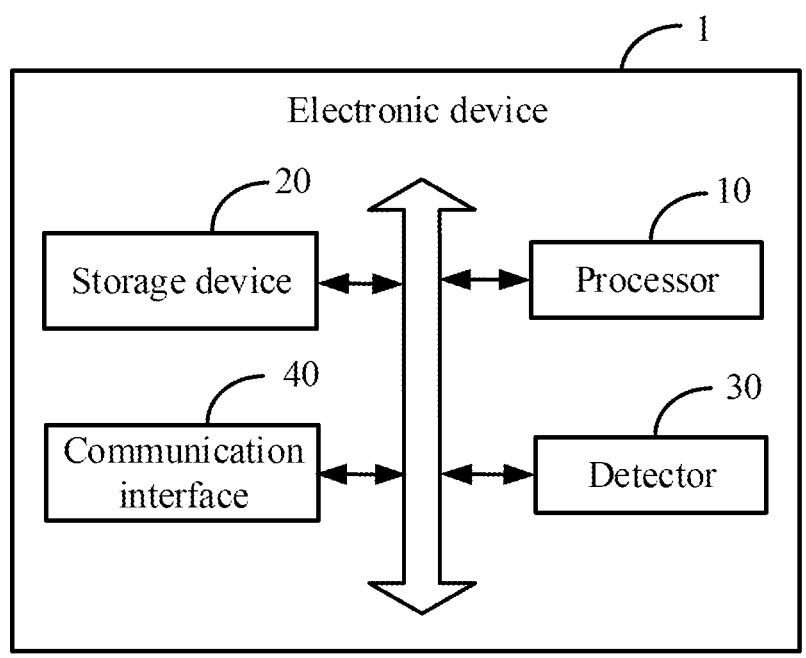
FIG. 2 is a block diagram of an embodiment of an electronic device configured to detect and compensate CNC tools.

FIG. 2 illustrates the electronic device 1 in one embodiment. The electronic device 1 includes, but is not limited to, a processor 10, a storage device 20, a detector 30, and a communication interface 40. FIG. 2 illustrates only one example of the electronic device 1. Other examples can include more or fewer components than as illustrated or have a different configuration of the various components in other embodiments.

The processor 10 can be a central processing unit (CPU), a microprocessor, or other data processor chip that performs functions in the electronic device 1.

In one embodiment, the storage device 20 can include various types of non-transitory computer-readable storage mediums. For example, the storage device 20 can be an internal storage system, such as a flash memory, a random access memory (RAM) for the temporary storage of information, and/or a read-only memory (ROM) for permanent storage of information. The storage device 20 can also be an external storage system, such as a hard disk, a storage card, or a data storage medium.

In one embodiment, the detector 30 checks the tool 201 using detection medium. The detection medium can be infrared rays, the detector 30 can be an infrared tool detection instrument. The detector 30 checks the tool 201 using the infrared rays. In other embodiments, the detection medium can also be lasers, the detector 30 can be a laser tool detection instrument, the detector 30 checks the tool 201 using the lasers.

In one embodiment, the communication interface 40 is coupled with the processor 10 and the detector 30. The communication interface 40 receives detection parameters of the detector 30.

Figure 3:
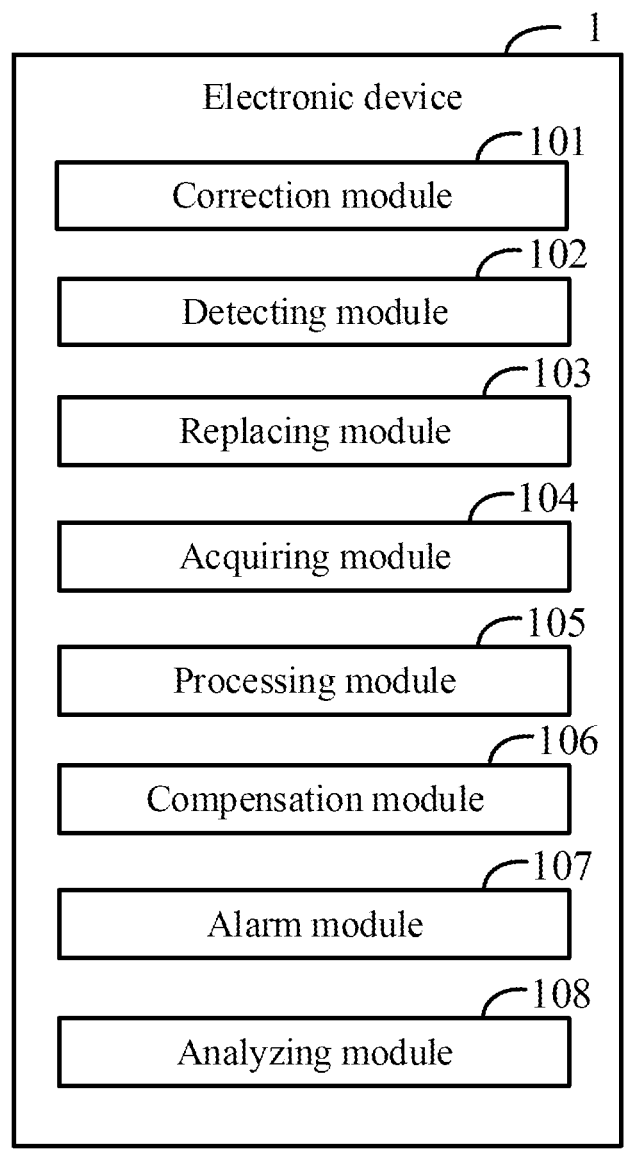
FIG. 3 is a functional block diagram of an embodiment of an electronic device configured to detect and compensate CNC tools.

As illustrated in FIG. 3, the electronic device 1 at least includes a correction module 101, a detecting module 102, a replacing module 103, an acquiring module 104, a processing module 105, a compensation module 106, an alarm module 107, and an analyzing module 108. The modules 101-108 can be collections of software instructions stored in the storage device 20 of the electronic device 1 and executed by the processor 10. The modules 101-108 also can include functionality represented as hardware or integrated circuits, or as software and hardware combinations, such as a special-purpose processor or a general-purpose processor with special-purpose firmware.

The correction module 101 transmits a correction instruction, to correct linearity and horizontal of the detection medium transmitted by the detector 30, and measure a diameter and center coordinates of the detection medium.

In one embodiment, before issuing correction, a correction rod is mounted on the main shaft 202 of the CNC device 2, and then the detector 30 transmits the detection medium to a direction of the main shaft 202.

In one embodiment, a point on a horizontal plane of the CNC device 2 is taken as an origin, a horizontal straight line passing through the origin is taken as an X-axis, and a straight line passing through the origin and perpendicular to the horizontal line is taken as a Y-axis. Finally, a straight line of Z-axis passing vertically through the origin enables a three-dimensional coordinate axis to be established.

In one embodiment, the CNC device 2 controls the correction rod to rotate and respectively contact two positions on the detection medium, so as to generate two Y-direction coordinates of the main shaft 202 when contacting the two positions. The correction module 101 determines whether a difference between the two Y-direction coordinates of the main shaft 202 corresponding to the two positions is greater than a first preset value. If the difference between the two Y-direction coordinates of the main shaft 202 corresponding to the two positions is greater than the first preset value, the correction module 101 transmits the correction instruction to correct the position of the detector 30, until the difference between the two Y-direction coordinates of the main shaft 202 corresponding to the two positions is less than or equal to the first preset value. Thereby, the linearity of the detection medium is rendered accurate.

Further, the CNC device 2 controls the correction rod to rotate and respectively contact two positions on the detection medium, to generate Z-direction coordinates of the main shaft 202 when contacting the two positions. The correction module 101 determines whether a difference between the Z-direction coordinates of the main shaft 202 corresponding to the two positions is greater than the first preset value. If the difference between the Z-direction coordinates of the main shaft 202 corresponding to the two positions is greater than the first preset value, the correction module 101 transmits the correction instruction, to correct the position of the detector 30, until the difference between the two Z-direction coordinates of the main shaft 202 corresponding to the two positions is less than or equal to the first preset value. Thereby, the horizontal orientation of the detection medium is rendered accurate. In one embodiment, the first preset value can be 0.01 mm.

Further, the CNC device 2 controls the correction rod to rotate and respectively contact upper and lower ends of the detection medium at the same position, and generates a diameter K of the detection medium by calculating a distance between the upper and lower ends.

Further, the CNC device 2 controls the correction rod to rotate and respectively touch the upper and lower ends of the detection medium at the same position, and generates the center coordinate of the detection medium according to the coordinates of the upper and lower ends.

The detecting module 102 detects whether a first tool 201 is correctly mounted when the first tool 201 is arranged on the CNC device 2.

In one embodiment, the CNC device 2 includes a number of work stations, and the first tool 201 is mounted on the one of the work stations. Each work station carries a serial number, the first tool 201 defines a tool number, and the tool number corresponds to the serial number. The first tool 201 carries a two-dimensional code for recording a relationship between the tool number and the serial number.

In one embodiment, the detecting module 102 controls a scanning device (not shown) to scan the two-dimensional code to reveal the serial number of the work station corresponding to the tool number of the first tool 201, and determine whether the revealed serial number is the same as the serial number of the current work station. If the revealed serial number is the same as the serial number of the current station, the detecting module 102 determines that the first tool 201 is correctly mounted. If the revealed serial number is not the same as the serial number of the current station, the detecting module 102 determines that the first tool 201 is not correctly mounted.

If the detecting module 102 determines that the first tool 201 is not correctly amounted, the replacing module 103 transmits a replace instruction, to replace the first tool 201 with a second tool. In one embodiment, the tool number of the second tool must correspond to the serial number of the work station on which the second tool is mounted.

The acquiring module 104 acquires a first parameter generated by the detector 30 in detecting the first tool 201.

In one embodiment, the acquiring module 104 acquires the first parameter generated by the detector 30 in detecting the first tool 201 through the communication interface 40. The first parameter includes a base information of the first tool 201, and the base information includes service life, blade break information, and blade chipping information. In one embodiment, the service life of the first tool 201 can be a difference between a preset maximum number and a number of pieces processed to date.

Further, the acquiring module 104 transmits a detection signal, and controls the detector 30 to transmit the detection medium in a preset scanning range and a preset starting region to scan a body of the first tool 201. The blade break information of the first tool 201 is formed according to a scanning result of the detector 30. In one embodiment, the preset scanning range can include the whole of the body of the first tool 201, and the preset starting region can be a preset positional percentage of the two ends of the first tool 201 away from the center. For example, the preset percent can be 2%. When scanning the body of the first tool 201, if the detector 30 does not receive reflected detection medium, a determination is made that the blade break is generated on the current scanned position of the first tool 201.

Further, the acquiring module 104 transmits a detection signal, controls the first tool 201 to rotate, controls a side wall of the first tool 201 to approach the detection medium, and acquires an X and Y coordinate value of the main shaft 202 when the detector 30 detects that the side wall of the first tool 201 blocks the detection medium. The diameter of the first tool 1 is measured according to the X and Y coordinate value of the main shaft 202, the diameter, and the center coordinates of the detection medium. The X and Y coordinates of the main shaft 202 are assumed to be $(X_1, Y_1)$, and the coordinate value of the X and Y coordinate is H=

$\sqrt{X_1^2+Y_1^2}$. The center coordinates of the detection medium are assumed to be $(X_0, Y_0)$, and the coordinate value of the center coordinates is $J=\sqrt{X_0^2+Y_0^2}$, then the diameter D1 of the first tool 201 is calculated according to the following equation: $D1=(H-J-K/2)\times 2$.

Further, the acquiring module 104 can generate the blade chipping information according to a difference between a theoretical diameter and the diameter D1 of the first tool 201. In one embodiment, if the difference between the theoretical diameter and the diameter D1 of the first tool 201 is greater than a second preset value, the acquiring module 104 determines that the blade of first tool 201 is chipped. If the difference between the theoretical diameter and the diameter D1 of the first tool 201 is less than or equal to the second preset value, the acquiring module 104 determines that the blade of first tool 201 is not chipped.

The replacing module 103 further transmits a tool replace instruction according to the first parameter, to replace the first tool 201 with the second tool.

In one embodiment, the replacing module 103 determines whether the first parameter meets the first preset parameter. If the first parameter does not meet the first preset parameter, that is, the service life of the first tool 201 is less than or equal to zero, and the first tool 201 is broken or chipped, the replacing module 103 transmits the tool replace instruction, to replace the first tool 201 with the second tool.

In one embodiment, if the first parameter meets the first preset parameter, that is, the service life of the first tool 201 is greater than zero, and the first tool 201 is not broken or not chipped, the processing module 105 acquires the first parameter and transmits a control instruction to control the first tool 201 to proceed to process the workpiece.

The acquiring module 104 further acquires a second parameter detected by the detector 30 when the first tool 201 processes the workpiece.

In one embodiment, the second parameter includes wear information, and the wear information includes length extension information, length wear information, radial wear information, and blade thickness wear information. Each time the first tool 201 finishes the processing of one workpiece, the detector 30 can detect the resulting wear information of the first tool 201, thereby timely determining the condition of the first tool 201 so as to avoid poor or defective processing of the first tool 201 on the next workpiece.

In one embodiment, the acquiring module 104 transmits a detection signal, to control the first tool 201 to rotate, and control a bottom of the first tool 201 to approach the detection medium, and the acquiring module 104 acquires a Z-axis coordinate value of the main shaft 202 when the detection medium is blocked by the bottom of the first tool 201. The length of the first tool 201 is thus established. Further, the acquiring module 104 establishes the length extension information and length wear information of the first tool 201 by calculating a difference between the tool length and the theoretical length of the first tool 201.

Further, the acquiring module 104 further acquires the diameter of the first tool 201 measured by the detector 30, and generates the radial wear information of the first tool 201 by calculating the difference between the measured diameter and the theoretical diameter.

Further, the acquiring module 104 transmits a detection signal, to control the first tool 201 to rotate, control a bottom of the blade of the first tool 201 to approach the detection medium, and the acquiring module 104 acquires the Z-axis coordinate value a of the main shaft 202 when the detector 30 detects that the bottom of the blade of the first tool 201 blocks the detection medium. The acquiring module 104 further transmits a detection signal, to control a top of the blade of the first tool 201 in a rotating state to approach the detection medium, and the acquiring module 104 acquires the Z-axis coordinate value b of the main shaft 202 when the detector 30 detects that the top of the blade of the first tool 201 blocks the detection medium. The detector 30 can calculate the blade thickness of the first tool 201 as an actual blade thickness by calculating the difference between the coordinate values a and b. The acquiring module 104 can establish the blade thickness wear information of the first tool 201 by calculating the difference between the actual blade thickness and a theoretical blade thickness of the first tool 201.

The compensation module 106 acquires the second parameter, and transmits a compensation instruction according to the second parameter, to adjust a position of the first tool 201.

In one embodiment, the compensation module 106 determines whether the second parameter meets a second preset parameter. If the compensation module 106 determines that the second parameter meets the second preset parameter, the compensation instruction is used to adjust the position of the first tool 201.

In one embodiment, when the difference between the tool length and the theoretical tool length is less than or equal to a third preset value, the compensation module 106 transmits a compensation instruction, to control movement of the main shaft 202 to adjust the length of the first tool 201.

For example, when the length of the first tool 201 is elongated by 0.05 mm, the compensation module 106 controls the main shaft 202 to move up by 0.05 mm in the Z direction, thereby increasing a relative distance between the tool processing surface and the workpiece to be processed. When the length of the first tool 201 is worn down by 0.05 mm, the compensation module 106 controls the main shaft 202 to move down by 0.05 mm in the Z direction, so as to achieve adjustment by reducing the relative distance between the tool processing surface and the workpiece to be processed.

When the difference between the diameter and the theoretical diameter is less than or equal to the third preset value, the compensation module 106 transmits a compensation instruction, to control the movement of the main shaft 202 to adjust the radial orientation and position of the first tool 201.

For example, when the diameter of the first tool 201 is worn by 0.05 mm, the compensation module 106 controls a movement stroke of the main shaft 202 in the X direction to increase by 0.05 mm when the first tool 201 is processing the workpiece. Thereby, compensation is applied by increasing the contact area between the tool processing surface and the workpiece to be processed.

The replacing module 103 further transmits a tool replace instruction according to the second parameter, to replace the first tool 201 with the second tool.

In one embodiment, when the compensation module 106 determines that the second parameter does not conform to the second preset parameter, the replacing module 103 transmits a tool replace instruction to replace the first tool 201 with the second tool.

In one embodiment, when the difference between the length and the theoretical length of the first tool 201 is greater than the third preset value, and/or when the difference between the diameter and the theoretical diameter of the first tool 201 is greater than the third preset value, and/or when the difference between the blade thickness and the theoretical blade thickness is not equal to zero, the replacing module 103 transmits a tool replace instruction to control the CNC device 2 to replace the first tool 201 with the second tool.

In other embodiments, when the difference between the actual length and the theoretical length of the first tool 201 is greater than the third preset value, and/or when the difference between the diameter and the theoretical diameter of the first tool 201 is greater than the third preset value, and/or when the difference between the blade thickness and the theoretical blade thickness is not equal to zero, the alarm module 107 outputs a prompt for the first tool 201 to be replaced with the second tool. In one embodiment, the prompt may be a sound output by audio loudspeaker (not shown), or text output by a display screen (not shown), or warning light emitted by an indicator light (not shown).

Further, the acquiring module 104 further acquires the third parameter generated when the detector 30 detects the second tool, and the third parameter includes a diameter and a blade thickness. The processing module 105 transmits a control instruction according to the third parameter, to control the second tool to process the workpieces.

In one embodiment, when the diameter of the second tool detected by the detector 30 is the same as the theoretical diameter, and the detected blade thickness is the same as the theoretical blade thickness, the processing module 105 transmits a control instruction to control the second tool to proceed to process the workpiece. When the diameter of the second tool detected by the detector 30 is not the same as the theoretical diameter, and the detected blade thickness is not the same as the theoretical blade thickness, the replacing module 103 transmits a tool replace instruction to replace the second tool with a third tool.

Further, the acquiring module 104 also acquires a second parameter from the detector 40 when the second tool is processing the workpiece. The compensation module 106 transmits a compensation instruction according to the second parameter to adjust the position of the second tool. The replacing module 103 also transmits a tool replace instruction according to the second parameters, to replace the second tool with a third tool.

The analysis module 108 analyzes usage status of the tool 201 at preset time intervals.

In one embodiment, the analysis module 108 analyzes usage status items of the tool 201 according to the tool size data generated by the detector 30 at the preset time intervals. In one embodiment, the preset time interval can be one month.

In one embodiment, the usage status items includes, but is not limited to, differences between an actual service life and a theoretical service life of tools of the same materials and different models, data that the actual service life of the tools of the same materials and different models affected by condition parameters (e.g. temperature, humidity, fixture pressure) of processing environment of the CNC device, a curve of wear values of the length, radius, and blade thickness of the tools of the same materials and different models, the deformation data statistics of the same material and different models, statistics data of transform of the tools of the same materials and different models, statistics data of blade break of the tools of the same materials and different models, forewarning data of over threshold of tool wear, tool extension, and tool pressure, comparisons between comprehensive uses of the tools of different materials or different models, comparisons between different parameters (e.g. length, radius, pressure, blade thickness) of the tools of different materials or different models, and analysis reports of comprehensive benefit according to tool usage and consumption in workshops and line units.

Figure 4:
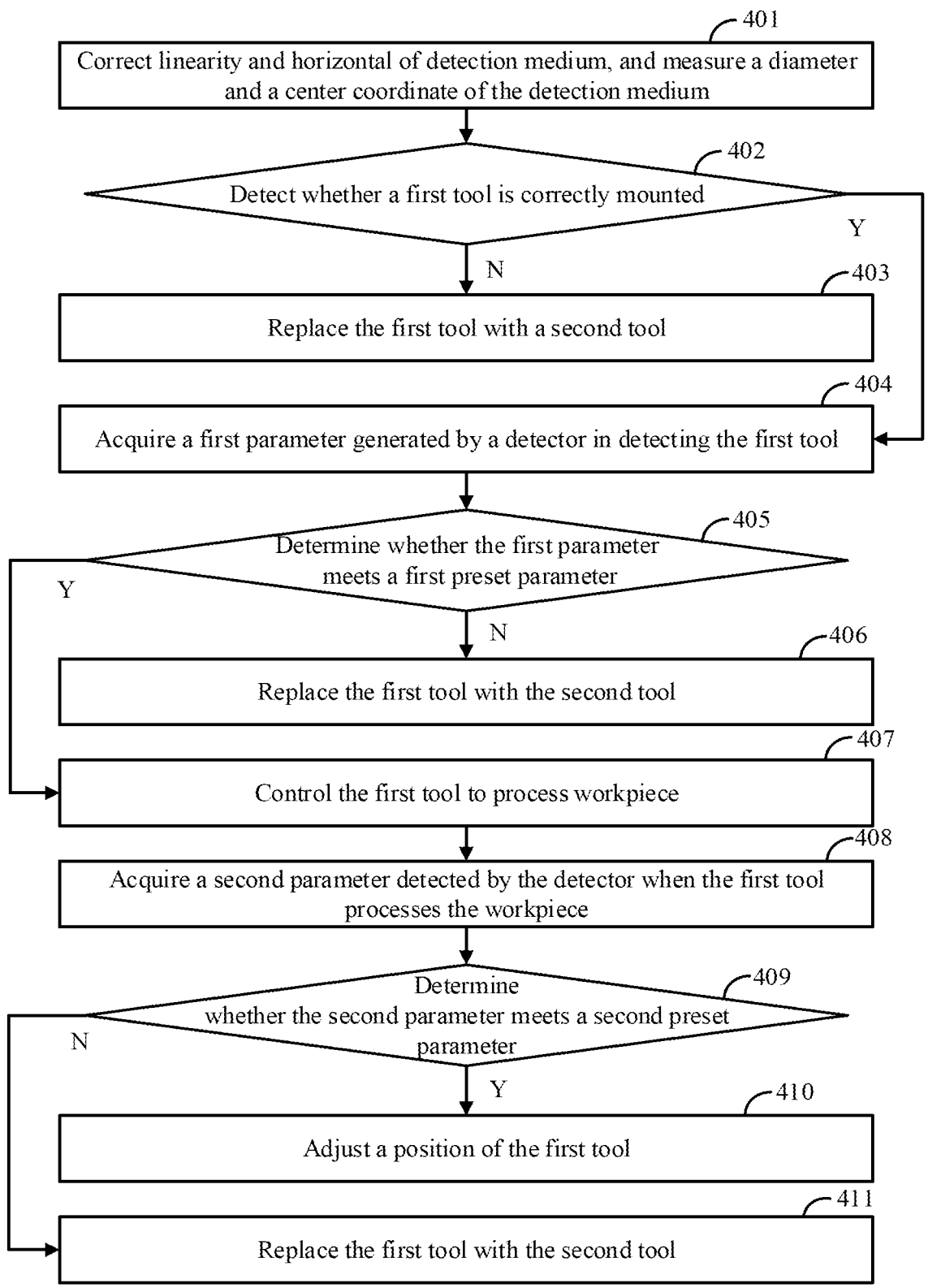
FIG. 4 illustrates a flowchart of an embodiment of a method for detecting and compensating CNC tools.

FIG. 4 illustrates a flowchart of an embodiment of a method for detecting and compensating CNC tools. The method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 401.

At block 401, the correction module 101 transmits a correction instruction, to correct linearity and horizontal of the detection medium transmitted by the detector 30, and measure a diameter and center coordinates of the detection medium.

In one embodiment, before issuing correction, a correction rod is mounted on the main shaft 202 of the CNC device 2, and then the detector 30 transmits the detection medium to a direction of the main shaft 202.

In one embodiment, a point on a horizontal plane of the CNC device 2 is taken as an origin, a horizontal straight line passing through the origin is taken as an X-axis, and a straight line passing through the origin and perpendicular to the horizontal line is taken as a Y-axis. Finally, a straight line of Z-axis passing vertically through the origin enables a three-dimensional coordinate axis to be established.

In one embodiment, the CNC device 2 controls the correction rod to rotate and respectively contact two positions on the detection medium, so as to generate two Y-direction coordinates of the main shaft 202 when contacting the two positions. The correction module 101 determines whether a difference between the two Y-direction coordinates of the main shaft 202 corresponding to the two positions is greater than a first preset value. If the difference between the two Y-direction coordinates of the main shaft 202 corresponding to the two positions is greater than the first preset value, the correction module 101 transmits the correction instruction to correct the position of the detector 30, until the difference between the two Y-direction coordinates of the main shaft 202 corresponding to the two positions is less than or equal to the first preset value. Thereby, the linearity of the detection medium is rendered accurate.

Further, the CNC device 2 controls the correction rod to rotate and respectively contact two positions on the detection medium, to generate Z-direction coordinates of the main shaft 202 when contacting the two positions. The correction module 101 determines whether a difference between the Z-direction coordinates of the main shaft 202 corresponding to the two positions is greater than the first preset value. If the difference between the Z-direction coordinates of the main shaft 202 corresponding to the two positions is greater than the first preset value, the correction module 101 transmits the correction instruction, to correct the position of the detector 30, until the difference between the two Z-direction coordinates of the main shaft 202 corresponding to the two positions is less than or equal to the first preset value. Thereby, the horizontal orientation of the detection medium is rendered accurate. In one embodiment, the first preset value can be 0.01 mm.

Further, the CNC device 2 controls the correction rod to rotate and respectively contact upper and lower ends of the detection medium at the same position, and generates a diameter K of the detection medium by calculating a distance between the upper and lower ends.

Further, the CNC device 2 controls the correction rod to rotate and respectively touch the upper and lower ends of the detection medium at the same position, and generates the center coordinate of the detection medium according to the coordinates of the upper and lower ends.

At block 402, a detecting module 102 detects whether a first tool 201 is correctly mounted when the first tool 201 is arranged on the CNC device 2. If the first tool 201 is correctly mounted when the first tool 201 is arranged on the CNC device 2, the process goes to block 404. If the first tool 201 is not correctly mounted when the first tool 201 is arranged on the CNC device 2, the process goes to block 403.

In one embodiment, the CNC device 2 includes a number of work stations, and the first tool 201 is mounted on the one of the work stations. Each work station carries a serial number, the first tool 201 defines a tool number, and the tool number corresponds to the serial number. The first tool 201 carries a two-dimensional code for recording a relationship between the tool number and the serial number.

In one embodiment, the detecting module 102 controls a scanning device (not shown) to scan the two-dimensional code to reveal the serial number of the work station corresponding to the tool number of the first tool 201, and determine whether the revealed serial number is the same as the serial number of the current work station. If the revealed serial number is the same as the serial number of the current station, the detecting module 102 determines that the first tool 201 is correctly mounted. If the revealed serial number is not the same as the serial number of the current station, the detecting module 102 determines that the first tool 201 is not correctly mounted.

At block 403, the replacing module 103 transmits a replace instruction if the detecting module 102 determines that the first tool 201 is not correctly mounted, to replace the first tool 201 with a second tool. In one embodiment, the tool number of the second tool corresponds to the serial number of the work station on which the second tool is mounted.

At block 404, the acquiring module 104 acquires a first parameter generated by the detector 30 in detecting the first tool 201.

In one embodiment, the acquiring module 104 acquires the first parameter generated by the detector 30 in detecting the first tool 201 through the communication interface 40. The first parameter includes a base information of the first tool 201, and the base information includes service life, blade break information, and blade chipping information. In one embodiment, the service life of the first tool 201 can be a difference between a preset maximum number and a number of pieces processed to date.

Further, the acquiring module 104 transmits a detection signal, and controls the detector 30 to transmit the detection medium in a preset scanning range and a preset starting region to scan a body of the first tool 201. The blade break information of the first tool 201 is formed according to a scanning result of the detector 30. In one embodiment, the preset scanning range can include the whole of the body of the first tool 201, and the preset starting region can be a preset positional percentage of the two ends of the first tool 201 away from the center. For example, the preset percent can be 2%. When scanning the body of the first tool 201, if the detector 30 does not receive reflected detection medium, a determination is made that the blade break is generated on the current scanned position of the first tool 201.

Further, the acquiring module 104 transmits a detection signal, controls the first tool 201 to rotate, controls a side wall of the first tool 201 to approach the detection medium, and acquires an X and Y coordinate value of the main shaft 202 when the detector 30 detects that the side wall of the first tool 201 blocks the detection medium. The diameter of the first tool 1 is measured according to the X and Y coordinate value of the main shaft 202, the diameter, and the center coordinates of the detection medium. The X and Y coordinates of the main shaft 202 are assumed to be $(X_1, Y_1)$, and the coordinate value of the X and Y coordinate is $H=\sqrt{X_1^2+Y_1^2}$. The center coordinates of the detection medium are assumed to be $(X_0, Y_0)$, and the coordinate value of the center coordinates is $J=\sqrt{X_0^2+Y_0^2}$, then the diameter D1 of the first tool 201 is calculated according to the following equation: $D1=(H-J-K/2)\times 2$.

Further, the acquiring module 104 can generate the blade chipping information according to a difference between a theoretical diameter and the diameter D1 of the first tool 201. In one embodiment, if the difference between the theoretical diameter and the diameter D1 of the first tool 201 is greater than a second preset value, the acquiring module 104 determines that the blade of first tool 201 is chipped. If the difference between the theoretical diameter and the diameter D1 of the first tool 201 is less than or equal to the second preset value, the acquiring module 104 determines that the blade of first tool 201 is not chipped.

The replacing module 103 further transmits a tool replace instruction according to the first parameter, to replace the first tool 201 with the second tool.

At block 405, the replacing module 103 determines whether the first parameter meets the first preset parameter. If the first parameter does not meet the first preset parameter, the process goes to block 406. If the first parameter meets the first preset parameter, the process goes to block 407.

At block 406, the replacing module 103 transmits the tool replace instruction, to replace the first tool 201 with the second tool.

At block 407, a processing module 105 acquires the first parameter and transmits a control instruction to control the first tool 201 to process the workpiece.

At block 408, the acquiring module 104 further acquires a second parameter from the detector 30 when the first tool 201 processes the workpiece.

In one embodiment, the second parameter includes wear information, and the wear information includes length extension information, length wear information, radial wear information, and blade thickness wear information. Each time the first tool 201 finishes the processing of one workpiece, the detector 30 can detect the resulting wear information of the first tool 201, thereby timely determining the condition of the first tool 201 so as to avoid poor or defective processing of the first tool 201 on the next workpiece.

In one embodiment, the acquiring module 104 transmits a detection signal, to control the first tool 201 to rotate, and control a bottom of the first tool 201 to approach the detection medium, and the acquiring module 104 acquires a Z-axis coordinate value of the main shaft 202 when the detection medium is blocked by the bottom of the first tool 201. The length of the first tool 201 is thus established. Further, the acquiring module 104 establishes the length extension information and length wear information of the first tool 201 by calculating a difference between the tool length and the theoretical length of the first tool 201.

Further, the acquiring module 104 further acquires the diameter of the first tool 201 measured by the detector 30, and generates the radial wear information of the first tool 201 by calculating the difference between the measured diameter and the theoretical diameter.

Further, the acquiring module 104 transmits a detection signal, to control the first tool 201 to rotate, control a bottom of the blade of the first tool 201 to approach the detection medium, and the acquiring module 104 acquires the Z-axis coordinate value a of the main shaft 202 when the detector 30 detects that the bottom of the blade of the first tool 201 blocks the detection medium. The acquiring module 104 further transmits a detection signal, to control a top of the blade of the first tool 201 in a rotating state to approach the detection medium, and the acquiring module 104 acquires the Z-axis coordinate value b of the main shaft 202 when the detector 30 detects that the top of the blade of the first tool 201 blocks the detection medium. The detector 30 can calculate the blade thickness of the first tool 201 as an actual blade thickness by calculating the difference between the coordinate values a and b. The acquiring module 104 can establish the blade thickness wear information of the first tool 201 by calculating the difference between the actual blade thickness and a theoretical blade thickness of the first tool 201.

At block 409, a compensation module 106 determines whether the second parameter meets a second preset parameter. If the compensation module 106 determines that the second parameter meets the second preset parameter, the process goes to block 410. If the compensation module 106 determines that the second parameter does not meet the second preset parameter, the process goes to block 411.

At block 410, the compensation module 106 acquires the second parameter, and transmit a compensation instruction according to the second parameter, to adjust a position of the first tool 201.

At block 411, the replacing module 103 transmits the tool replace instruction, to replace the first tool 201 with the second tool.

In one embodiment, when the difference between the tool length and the theoretical tool length is less than or equal to a third preset value, the compensation module 106 transmits a compensation instruction, to control movement of the main shaft 202 to adjust the length of the first tool 201.

For example, when the length of the first tool 201 is elongated by 0.05 mm, the compensation module 106 controls the main shaft 202 to move up by 0.05 mm in the Z direction, thereby increasing a relative distance between the tool processing surface and the workpiece to be processed. When the length of the first tool 201 is worn down by 0.05 mm, the compensation module 106 controls the main shaft 202 to move down by 0.05 mm in the Z direction, so as to achieve adjustment by reducing the relative distance between the tool processing surface and the workpiece to be processed.

When the difference between the diameter and the theoretical diameter is less than or equal to the third preset value, the compensation module 106 transmits a compensation instruction, to control the movement of the main shaft 202 to adjust the radial orientation and position of the first tool 201.

For example, when the diameter of the first tool 201 is worn by 0.05 mm, the compensation module 106 controls a movement stroke of the main shaft 202 in the X direction to increase by 0.05 mm, when the first tool 201 is processing the workpiece. Thereby, compensation is applied by increasing the contact area between the tool processing surface and the workpiece to be processed.

The replacing module 103 further transmits a tool replace instruction according to the second parameter, to replace the first tool 201 with the second tool.

In one embodiment, when the compensation module 106 determines that the second parameter does not conform to the second preset parameter, the replacing module 103 transmits a tool replace instruction to replace the first tool 201 with the second tool.

In one embodiment, when the difference between the length and the theoretical length of the first tool 201 is greater than the third preset value, and/or when the difference between the diameter and the theoretical diameter of the first tool 201 is greater than the third preset value, and/or when the difference between the blade thickness and the theoretical blade thickness is not equal to zero, the replacing module 103 transmits a tool replace instruction to control the CNC device 2 to replace the first tool 201 with the second tool.

In other embodiments, when the difference between the actual length and the theoretical length of the first tool 201 is greater than the third preset value, and/or when the difference between the diameter and the theoretical diameter of the first tool 201 is greater than the third preset value, and/or when the difference between the blade thickness and the theoretical blade thickness is not equal to zero, the alarm module 107 outputs a prompt for the first tool 201 to be replaced with the second tool. In one embodiment, the prompt may be a sound output by audio loudspeaker (not shown), or text output by a display screen (not shown), or warning light emitted by an indicator light (not shown).

Further, the method includes: the acquiring module 104 further acquires the third parameter generated when the detector 30 detects the second tool, and the third parameter includes a diameter and a blade thickness. The processing module 105 transmits a control instruction according to the third parameter, to control the second tool to process the workpieces.

In one embodiment, when the diameter of the second tool detected by the detector 30 is the same as the theoretical diameter, and the detected blade thickness is the same as the theoretical blade thickness, the processing module 105 transmits a control instruction to control the second tool to proceed to process the workpieces. When the diameter of the second tool detected by the detector 30 is not the same as the theoretical diameter, and the detected blade thickness is not the same as the theoretical blade thickness, the replacing module 103 transmits a tool replace instruction to replace the second tool with a third tool.

Further, the acquiring module 104 also acquires a second parameter from the detector 40 when the second tool is processing the workpiece. The compensation module 106 transmits a compensation instruction according to the second parameter to adjust the position of the second tool. The replacing module 103 also transmits a tool replace instruction according to the second parameters, to replace the second tool with a third tool.

The method further includes: analyzes usage status of the tool 201 at preset time intervals.

In one embodiment, the analysis module 108 analyzes usage status items of the tool 201 according to the tool size data generated by the detector 30 at the preset time intervals. In one embodiment, the preset time interval can be one month.

In one embodiment, the usage status items includes, but is not limited to, differences between an actual service life and a theoretical service life of tools of the same materials and different models, data that the actual service life of the tools of the same materials and different models affected by condition parameters (e.g. temperature, humidity, fixture pressure) of processing environment of the CNC device, a curve of wear values of the length, radius, and blade thickness of the tools of the same materials and different models, the deformation data statistics of the same material and different models, statistics data of transform of the tools of the same materials and different models, statistics data of blade break of the tools of the same materials and different models, forewarning data of over threshold of tool wear, tool extension, and tool pressure, comparisons between comprehensive uses of the tools of different materials or different models, comparisons between different parameters (e.g. length, radius, pressure, blade thickness) of the tools of different materials or different models, and analysis reports of comprehensive benefit according to tool usage and consumption in workshops and line units.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device for detecting and compensating Computerized Numerical Control (CNC) tools comprising:
    a communication interface configured to:
        receive from a detector first parameters of a first tool, the first parameters comprising at least one of service life, blade break information, and blade chipping information of the first tool; and
        receive from the detector second parameters of the first tool after the first tool processes a workpiece, the second parameters comprising at least one of length extension information, length wear information, radial wear information, and blade thickness wear information of the first tool;
    the detector that is coupled to the communication interface; wherein the detector is configured to:
        approach the first tool to detection medium in a Z-direction of a work coordinate axis of a CNC device;
        acquire a coordinate value a of a main shaft of the CNC device in the Z-direction when a bottom of the first tool blocks the detection medium;
        acquire a coordinate value b of the main shaft in the Z-direction when a top of the first tool blocks the detection medium;
        determine a length of the first tool according to the coordinate values a and b in the Z-direction; and
        generate the second parameters according to the length of the first tool;
    at least one processor coupled to the communication interface; and
    a storage device coupled to the at least one processor and storing instructions for execution by the at least one processor to cause the at least one processor to:
        acquire the first parameters;
        transmit a control instruction according to the first parameters, to control the first tool to process the workpiece;
        acquire the second parameters;
        transmit a compensation instruction according to the second parameters, to adjust a position of the first tool.

2. The electronic device according to claim 1, wherein the at least one processor is further caused to:
    transmit a tool replace instruction according to the first parameters, to replace the first tool with a second tool.

3. The electronic device according to claim 2, wherein the at least one processor is further caused to:
    acquire from the detector third parameters of the second tool, wherein the third parameters comprise at least one of a diameter and a blade thickness of the second tool; and
    control the second tool to process the workpiece according to the third parameters.

4. The electronic device according to claim 1, wherein the detector is configured to:
    transmit the detection medium to detect the at least one of the service life, the blade break information, the blade chipping information, the length extension information, the length wear information, the radial wear information, and the blade thickness wear information of the first tool; and
    generate the first parameters and the second parameters according to the at least one of the service life, the blade break information, the blade chipping information, the length extension information, the length wear information, the radial wear information, and the blade thickness wear information of the first tool.

5. The electronic device according to claim 4, wherein the detector is further configured to:
    correct at least one of linearity and horizontal of the detection medium; and
    measure a diameter and center coordinates of the detection medium.

6. The electronic device according to claim 5, wherein the detector is further configured to:
    approach the first tool to the detection medium in a surface formed by X and Y directions of a work coordinate axis of a CNC device;
    detect a coordinate value of a main shaft of the CNC device in the X and Y directions when a side wall of the first tool blocks the detection medium;
    determine a diameter of the first tool according to the coordinate value of the main shaft in the X and Y directions, the diameter and the center coordinates of the detection medium; and
    generate the blade chipping information according to a difference between a theoretical diameter and the diameter of the first tool.

7. The electronic device according to claim 5, wherein the at least one processor is further caused to:
    control the detector to transmit the detection medium in a preset scanning range and a preset starting region to scan a body of the first tool, and generate a scanning result; and
    generate the blade break information of the first tool according to the scanning result.

8. The electronic device according to claim 1, wherein the at least one processor is further caused to:
    acquire the second parameters each time the first tool finishes processing of one workpiece.

9. A method for detecting and compensating CNC tools implemented in an electronic device comprising:
    receiving from a detector first parameters of a first tool, the first parameters comprising at least one of service life, blade break information, and blade chipping information of the first tool;
    receiving from the detector second parameters of the first tool after the first tool processes a workpiece, the second parameters comprising at least one of length extension information, length wear information, radial wear information, and blade thickness wear information of the first tool;

generating the second parameters comprising:
approaching the first tool to detection medium in a Z-direction of a work coordinate axis of a CNC device;
acquiring a coordinate value a of a main shaft of the CNC device in the Z-direction when a bottom of the first tool blocks the detection medium;
acquiring a coordinate value b of the main shaft in the Z-direction when a top of the first tool blocks the detection medium;
determining a length of the first tool according to the coordinate values a and b in the Z-direction;
generating the second parameters according to the length of the first tool;

acquiring the first parameters;
transmitting a control instruction according to the first parameters, to control the first tool to process the workpiece;
acquiring the second parameters;
transmitting a compensation instruction according to the second parameters, to adjust a position of the first tool.

10. The method according to claim 9, further comprising:
transmitting a tool replace instruction according to the first parameters, to replace the first tool with a second tool.

11. The method according to claim 9, further comprising:
acquiring from the detector third parameters of the second tool, wherein the third parameters comprise at least one of a diameter and a blade thickness of the second tool; and
controlling the second tool to process the workpiece according to the third parameters.

12. The method according to claim 11, wherein a step of acquiring the first parameters comprises:
transmitting the detection medium to detect the at least one of the service life, the blade break information, the blade chipping information, the length extension information, the length wear information, the radial wear information, and the blade thickness wear information of the first tool; and generating the first parameters and the second parameters according to the at least one of the service life, the blade break information, the blade chipping information, the length extension information, the length wear information, the radial wear information, and the blade thickness wear information of the first tool.

13. The method according to claim 12, further comprising:
correcting at least one of linearity and horizontal of the detection medium; and
measuring a diameter and center coordinates of the detection medium.

14. The method according to claim 13, wherein detecting the blade chipping information comprises:
approaching the first tool to the detection medium in a surface formed by X and Y directions of a work coordinate axis of a CNC device;
detecting a coordinate value of a main shaft of the CNC device in the X and Y directions when a side wall of the first tool blocks the detection medium;
determining the diameter of the first tool according to the coordinate value of the main shaft in the X and Y directions, the diameter, and the center coordinates of the detection medium; and
generating the blade chipping information according to a difference between the theoretical diameter and the diameter of the first tool.

15. The method according to claim 13 wherein detecting the break information comprises:
controlling the detector to transmit the detection medium in a preset scanning range and a preset starting region to scan a body of the first tool, and generating a scanning result; and
generating the blade break information of the first tool according to the scanning result.

16. The method according to claim 9, wherein acquiring the second parameters comprises:
acquiring the second parameters each time the first tool finishes processing of one workpiece.

* * * * *